United States Patent [19]

Brane et al.

[11] Patent Number: 5,050,772

[45] Date of Patent: Sep. 24, 1991

[54] APPARATUS FOR MONITORING A FLOW OF FLUID THROUGH A FILTER MEDIUM

[76] Inventors: Earl P. Brane, Hideaway Hills, Ohio; Douglas K. Brane, Largo, Fla.

[21] Appl. No.: 507,352

[22] Filed: Apr. 9, 1990

[51] Int. Cl.[5] ........................................... B67D 5/30
[52] U.S. Cl. ........................................ 232/20; 73/198; 210/88; 210/100; 137/624.11; 222/14
[58] Field of Search ..................... 73/198; 210/87, 88, 210/89, 100; 137/624.11; 222/14, 16, 17, 20

[56] References Cited

U.S. PATENT DOCUMENTS

| | | | |
|---|---|---|---|
| 2,589,650 | 3/1952 | Wolcott Jr. | 222/20 |
| 2,810,435 | 10/1957 | Demi et al. | 137/624.11 |
| 2,810,435 | 10/1957 | Demi et al. | 137/624.11 |
| 3,097,762 | 7/1963 | Charnota et al. | 222/20 |
| 3,097,762 | 7/1963 | Demi et al. | |
| 4,262,467 | 5/1980 | Rutten et al. | 222/20 |
| 4,681,677 | 7/1987 | Kuh et al. | 210/88 |
| 4,698,146 | 10/1987 | Ellis | 210/87 |
| 4,708,264 | 11/1987 | Bruninga | 220/20 |
| 4,769,135 | 9/1988 | Norton | 73/198 |
| 4,903,731 | 2/1990 | Pappy | 222/20 |

Primary Examiner—Michael S. Huppert
Assistant Examiner—Kenneth Bomberg
Attorney, Agent, or Firm—Mueller and Smith

[57] ABSTRACT

Apparatus is provided for use as an in-line fluid flow monitor through filter media of a variety typically employed in households upstream of a kitchen faucet. The apparatus includes a housing with an input port leading to a housing cap within which a turbine chamber retains a rotating turbine. The rotating turbine is coupled to a reduction gear train positioned with a gear housing, in turn, retained within the body of the housing in a reduction gear chamber. Fluid communication is provided from the turbine chamber to the gear reduction chamber. The gear reduction chamber ends in an eccentric output which drives the pawl of a pawl and ratchet assembly forming part of a rotatable valve. This rotatable valve rotates in increments as a camming stem affixed thereto moves along a camming surface until encountering a slot component. When the slot component is encountered, the rotatable valve and camming stem falls into it under spring bias to close the valve and provide a cue to the user that the predetermined quantity of flow of fluid has occurred. The device then is simply reset by hand by manipulating the camming stem back upon the camming surface.

20 Claims, 4 Drawing Sheets

5,050,772

APPARATUS FOR MONITORING A FLOW OF FLUID THROUGH A FILTER MEDIUM

BACKGROUND OF THE INVENTION

The quality of water, for example as provided by utility organizations to domestic households and the like ranges widely. In general, it has been observed to have diminished to the extent that a water quality enhancement industry has developed of significant proportions.

One generally less expensive approach to water quality improvement provides for the positioning of a filter at a faucet location where water is drawn for drinking and cooking purposes. Typically, this location is at the kitchen sink. The type filter desired for this application usually is of an "inline" variety located within the water line ahead of or before the faucet at the sink. Such filters are quite simple, typically being provided as a retainer holding a filtration medium such as charcoal or the like used to remove contaminants. These filtration media have a limited capacity generally based on the number of gallons of water passing through them. Following a predetermined flow quantity, for example from 500 to 1500 gallons, the filtration medium must be changed, whereupon a next filtering period ensues. The number of gallons of water representing such filter capacity varies with the quality of water encountered, as well as with the filter used. Thus, a time estimate of useful filter life may be made based on these variables, as well as the extent of household use of water at the location of filtration. However, such estimates are inherently inaccurate and filter replacement is made in reliance of the householder's memory of the projected replacement date. Thus, a metering device is desirable for water use monitoring which remains inexpensive enough for the limited application at hand, but which is of a rugged and robust structure sufficient to withstand water line pressures, which typically are at 125 psi and can reach higher levels during water pressure excursions. For example, such devices should meet national criteria for performance at 400 psi.

In addition to measuring flow, these metering devices should be simply adjustable for accommodating various filter capacities and should provide some form of cuing to the user as to when time for replenishment is at hand. Installation of the meter and associated cuing logic should be simple in keeping with the noted cost criteria. In this regard, the utilization of electronics and associated power supply wiring or battery replenishment should be avoided. Generally, a turbine form of metering is contemplated for the purposes at hand, however, the rotational rate for such turbines, when used with purely mechanical metering structures requires a technique for rotation monitoring wherein the number of rotations will exceed 1,000,000. To achieve a necessary compactness while still carrying on such monitoring in a mechanical manner has posed difficulties to filter designers.

SUMMARY

The present invention is addressed to apparatus for monitoring the flow of fluid through a filter medium. Particularly suited to in-line household applications, the monitoring apparatus is fabricable under the cost constraints associated with such uses, while evidencing a design which provides reliable performance under the relatively higher line pressures encountered upstream of a household faucet or the like. Utilizing a turbine as a flow-to-mechanical monitoring output transducer, the monitor incorporates a rotational reduction scheme of greater than 1,000,000:1 while remaining housed within a highly compact housing. Necessary cuing to the household user that a filter medium is expended is by the simple procedure of turning off the fluid or water to an associated downstream sink faucet. However, the resetting procedure for the monitor is advantageously simple, requiring an elementary hand motion on the part of the user. Further, the device may be readily adjusted by the user for the fluid flow capacity of any given filter medium.

Another feature of the invention is to provide apparatus for monitoring a flow of fluid through a conduit which includes a housing having an input port and an output port connectable with the conduit. A turbine chamber is positioned within the housing in fluid communication with the input port for receiving fluid under pressure and a turbine is mounted within the turbine chamber which is rotatable by fluid incident thereon from the input port. A gear chamber is formed within the housing in fluid communication with the turbine chamber and a reduction gear train is positioned within the gear chamber rotatably drivably coupled with the turbine, having a predetermined reduction ratio and a rotational eccentric output component. A valve seat within the housing adjacent the output port is provided which includes an open valve cam surface and a valve closing detent portion. Additionally, a rotatable valve having a rotational drive component is positioned adjacent and is movable in select correspondence with the eccentric output. The rotatable valve further includes a valve closure portion extending therefrom including a camming stem slideably movable upon the valve cam surface to retain the valve closure portion in an open valve orientation. The camming stem is movable within the valve seat detent portion to effect blockage of fluid flow through the output port. A reset arrangement is provided for repositioning a rotatable valve camming stem upon the valve cam surface to effect opening the valve or permitting the flow therethrough of a predetermined quantity of fluid.

Another aspect of the invention provides apparatus for monitoring the flow of fluid under pressure through a filter medium of given capacity. The apparatus includes a housing having a body member and a cap coupled thereto. A turbine chamber is formed within the housing cap and a gear chamber is positioned within the housing body extending from the turbine chamber when the cap is coupled with the body and in fluid flow communication therewith. The valve chamber is located within the housing body adjacent to and in fluid flow communication with the gear chamber and having a valve seat, a valve cam surface, and a valve closing slot. Rotatably mounted within the turbine chamber is a turbine having a cylindrical stem portion extending into the gear chamber. An output port is provided in fluid flow communication with the turbine chamber for directing the flow of fluid under pressure thereto to effect rotation of the turbine. A reduction gear train is located within the gear chamber, having an input stage in rotationally driven contact with the turbine stem portion and having a predetermined reduction ratio providing a rotational output along a given axis extending within the valve chamber. A rotatable valve is provided which is mounted for rotation about a valve axis parallel with the given axis, having a rotational drive component connected in driven relationship with the reduction gear train output, a valve closure portion extending therefrom and movable along the valve axis into closing contact with the valve seat, and a camming stem slideably movable upon the valve cam surface during rotation to retain the valve closure portion at a location remote from the valve seat, effecting an open valve orientation and movable along the valve axis into the closing slot to effect positioning of the valve closure portion into valve closing contact with the valve seat. An output port is provided in fluid flow communication with the valve chamber for receiving the flow of fluid under pressure when the rotatable valve is in the open valve orientation, and a reset arrangement is provided for repositioning of rotatable valve camming stem for movement upon the valve cam surface to provide for the rotation of the rotatable valve about the valve axis an amount predetermined with respect to the filtered medium capacity.

Other objects of the invention will, in part, be obvious and will, in part, appear hereinafter. The invention, accordingly, comprises the apparatus possessing the construction, combination of elements, and arrangement of parts which are exemplified in the following detailed disclosure.

For a fuller understanding of the nature and objects of the invention, reference should be had to the following detailed description taken in connection with the accompanying drawings.

DETAILED DESCRIPTION

Water flow monitors structured in accordance with the invention are relatively small and capable of carrying out a gear reduction of the output of a small turbine at a reduction ratio greater than 1,000,000:1. This reduction is achieved within an inexpensive structure which still remains of such robust design that it is capable of being used in line under relatively higher water pressures. Further, the monitors provide the householder with a curing as to the point in time wherein the capacity of an associated filter medium has been reached. This is achieved by closing off the water flow or, at least substantially closing it off such that the user is aware that filter replacement is needed and the flow monitoring device is to be reset. Somewhat ideally, the resetting procedure also permits the monitor to be set for a variety of filter capacities as expressed in volumetric values.

Figure 1:
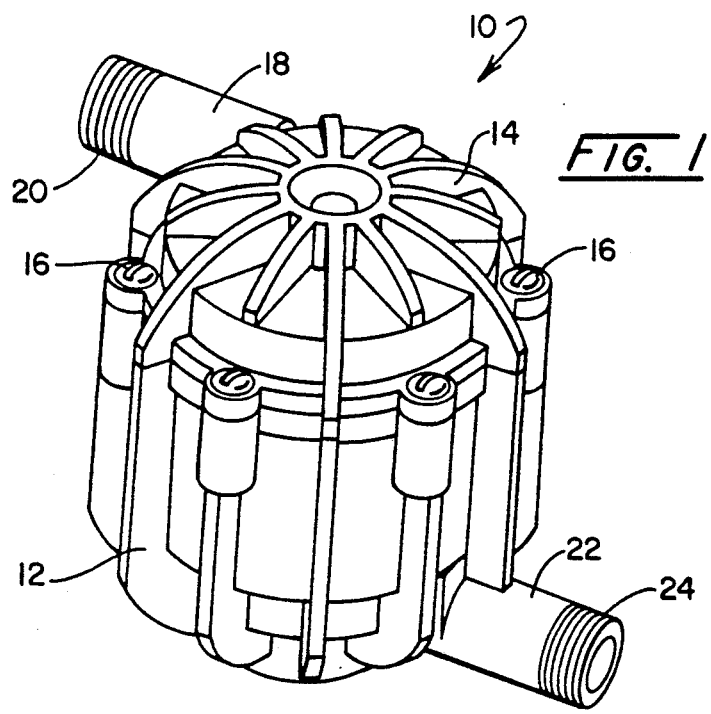
FIG. 1 is a perspective view of a fluid flow monitor according to the invention.

Looking to FIG. 1, the monitor is represented generally at 10 as including a housing 12 with a body portion of strong ribbed construction and having a cap portion 14 which is attached thereto by an array of screws, certain of which are represented at 16. Note that the cap 14 also is configured having reinforcing ribs thereon. Leading to the cap 14 is an input conduit 18 having a threaded end portion 20 suited for coupling within a household water line. In similar fashion, the lower region of housing 12 has integrally formed therein an output conduit 22 having a threaded end portion thereon 24 to facilitate insertion of the device 10 within the water line-filter assembly. To remain within necessary cost constraints, the device 10 is formed of a plastic, however, the selection of this plastic material preferably is such as to provide a very strong polymer, for example a glass filled "Nylon" material identified as number 7033 marketed by E. I. DuPont De Nemours and Company.

Figure 3:
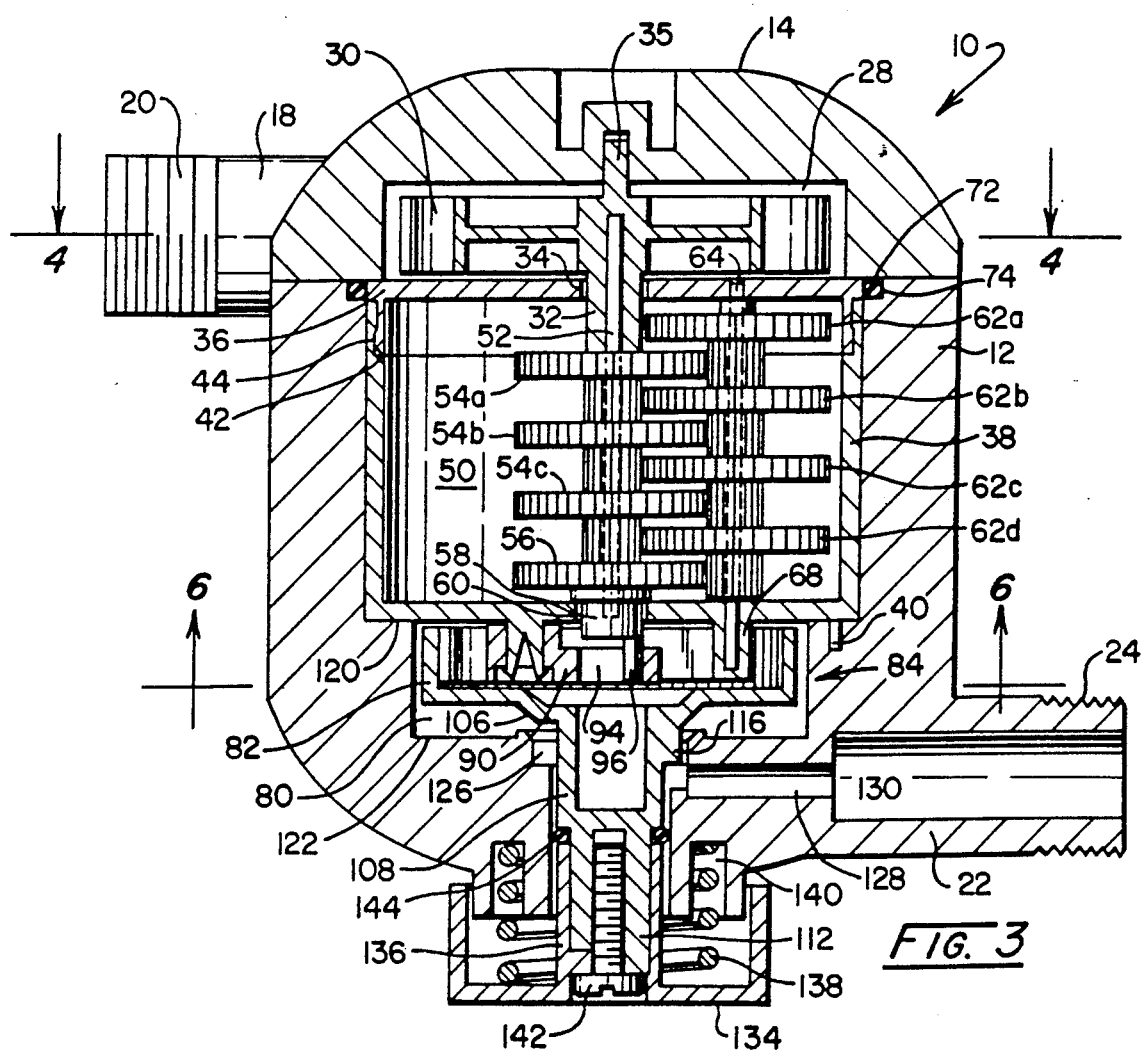
FIG. 3 is a partial sectional view of the apparatus of FIG. 1.
Figure 2:
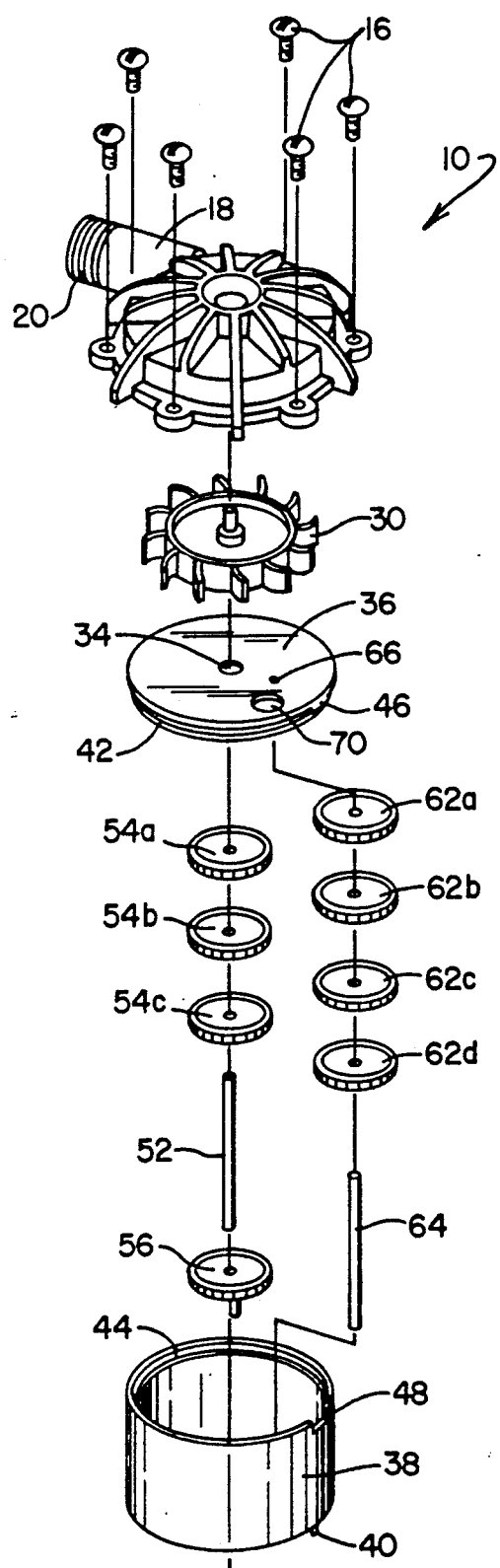
FIG. 2 is an exploded perspective diagram of the apparatus of FIG. 1.
Figure 2:
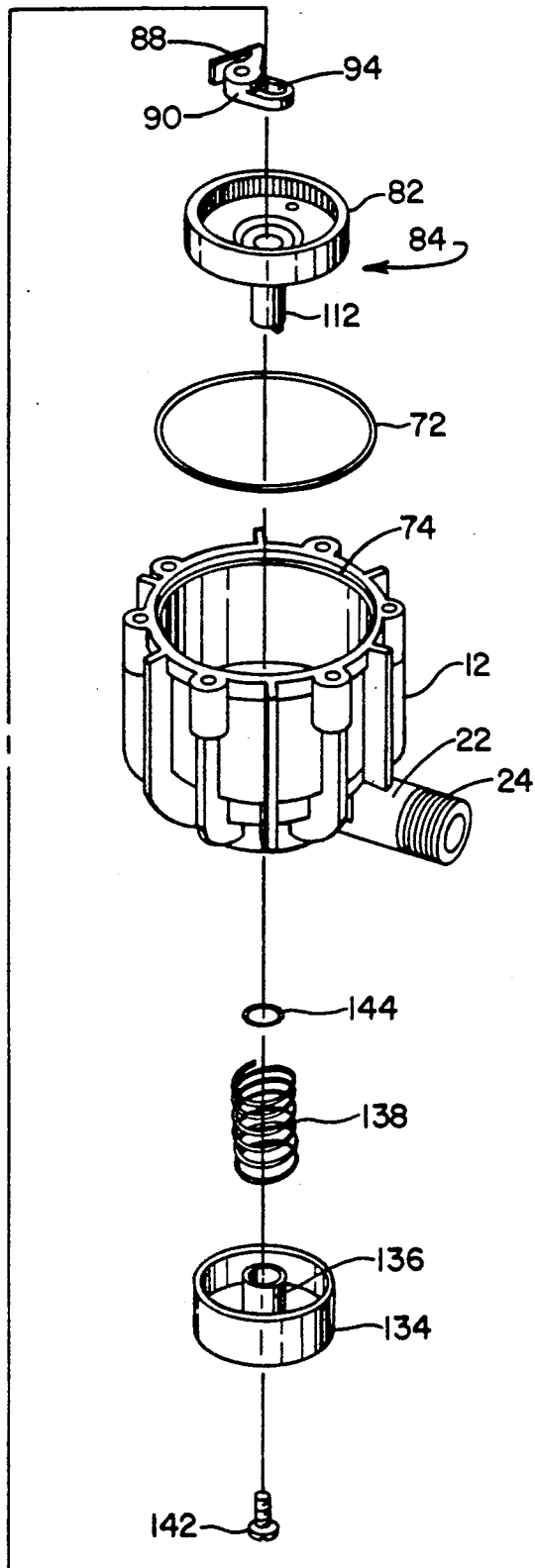
Figure 4:
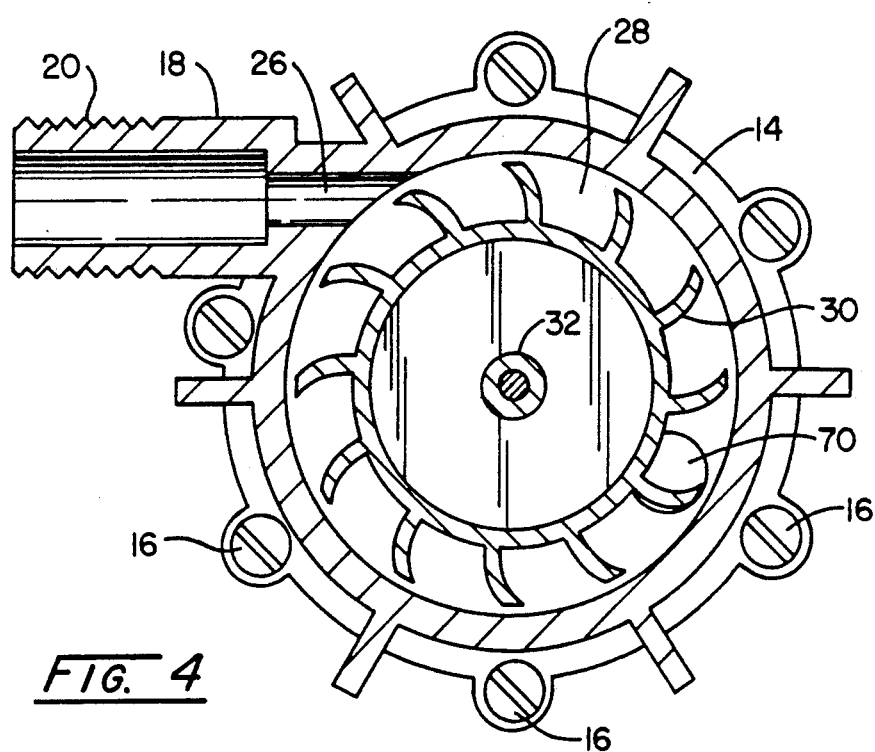
FIG. 4 is a sectional view of the apparatus of FIG. 3 taken through the plane 4—4 thereof.

Between the input conduit 18 and the exit or output conduit 22, water is caused to flow through the device 10 in somewhat of an axial manner coursing across the components which carry out the monitoring function. Looking additionally to FIG. 2 in conjunction with the figures to follow and, for the instant description, to FIGS. 3 and 4, fluid enters the device 10 from input conduit 18 at an input port 26 extending, in turn, to a turbine chamber 28 formed within cap 14. A turbine as at 30 is rotatably mounted within the chamber 28 to be driven from fluid exiting the input port 26. Note that the turbine is configured for unidirectional rotation. FIG. 3 reveals that the geared lower shaft or stem portion 32 of turbine 30 extends through an aperture or opening 34 formed in the cover 36 of a gear housing 38. Correspondingly, stem 35 of turbine 30 extends into a cylindrical receiving cavity within cap 14 to provide rotational, upwardly disposed axial support. Gear housing 38 is seen to be positioned within a corresponding gear cavity of housing body portion 12 and is inserted within that cavity in appropriate alignment by virtue of an integrally formed aligning pin 40. Housing 38 facilitates the manufacture of the monitoring device 10. Gear housing cover or top component 36 is readily snapped into its cover position by virtue of a ridge 42 formed therein which resiliently engages a corresponding groove 44 within gear housing 38. To assure the proper alignment of the cover 36, a tab (FIG. 2) is formed therein which engages a corresponding slot 48 formed within gear housing 38.

Slideably mounted within the stem 32 is a stainless steel shaft 52 which, in turn, supports four reduction gear assemblies including freely rotating assemblies 54a-54c and an output reduction gear 56. Gear 56, in turn, is seen to have integrally formed therewith a rotational component configured as a cylindrical shaft 58 which extends through an aperture or opening 60 formed in the bottom of gear housing 38. The reduction gear assembly of device 10 further includes another set of such gears as at 62a-62d which are mounted upon a stainless steel shaft 64. Shaft 64, in turn, extends from a small aperture 66 in gear housing cover 36 to a corresponding shaft support extension 68 having a cylindrical opening therein for receiving shaft 64. With the arrangement shown, the initial drive to the array of reduction gears is from the geared shaft portion 32 of turbine 30 which engages the corresponding teeth of reduction gear stage 62a. Stage 62a, in turn, engages gear stage 54a and the sequence of reductions continues to the final output stage 56. During the course of this reduction performance, fluid is caused to flow from the input conduit 18 and input port 26 through the turbine chamber 28 and then through an opening or aperture 70 within the gear housing cover 36 (see FIG. 4). Fluid tight integrity for the cap 14 and housing 12 combination as well as the gear housing 38 and cover 36 is provided by an O-ring 72 mounted within a shoulder 74 formed within housing 12. Positioned immediately beneath gear housing 38 is a valve chamber 80 into which the cylindrical shaft or rotational component output 58 of the gear train assembly within gear chamber 50 protrudes and which further contains the upwardly-disposed rotational drive component 82 of a rotatable valve represented generally at 84 as shown in isolation in FIG. 5.

Figure 6:
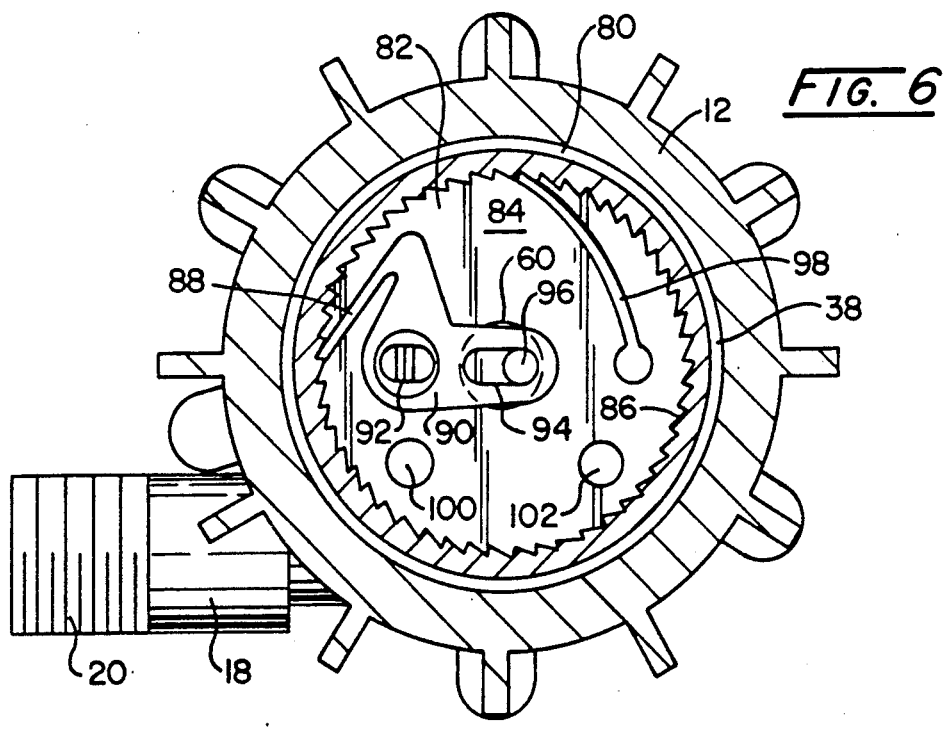
FIG. 6 is a sectional view of the apparatus of FIG. 3 taken through the plane 6—6 thereof.

Referring additionally to FIG. 6, the rotational drive component 82 is seen to be generally formed as an open cylinder, the interior peripheral wall of which is configured having ratchet teeth 86 aligned with the axis of the valve. Cooperating with these ratchet teeth 86 is the flexible arm portion 88 of a pawl 90. Pawl 90, in turn, is pivotally mounted upon a bifurcate shaft 92 with outer retainer detents formed integrally with and extending from the bottom of gear housing 38. This structuring permits facile mounting of the pawl 90 within the assembly 10. Pawl 90 also is formed having a slot 94 into which a downwardly extending stem or actuator 96 is slideably inserted. Stem 96 is eccentric with respect to the axis of shaft 58 and is of length sufficient to accommodate upward movement of rotatable valve 84. Stem 58 acts as a lever actuator and is formed integrally with the cylindrical shaft 58 extending from the final gear reduction stage 56. Thus, the output of the gear reduction stage is an eccentric component which functions to drive the pawl 90 while permitting vertical movement of the rotatable valve 84.

FIG. 6 further reveals that a flexible stop pawl 98 is integrally formed within the bottom side of gear housing 38 and functions to restrict the movement of the ratchet driven rotational drive component 82 to a singular rotational direction. Further, two apertures 100 and 102 are formed within the bottom side of gear housing 38 for purposes of permitting fluid flow from the gear chamber 50 into the valve chamber 80. With a preferred selection of the number of ratchet teeth within drive component 82, as well as the selection of the reduction gear structuring within chamber 50, a ratio of rotation between turbine 30 and the rotation of rotatable valve 84 is greater than 1,000,000:1 and preferably becomes 1,250,000:1. In general, 40 teeth are incorporated within the internally toothed ratchet component 86.

Figure 5:
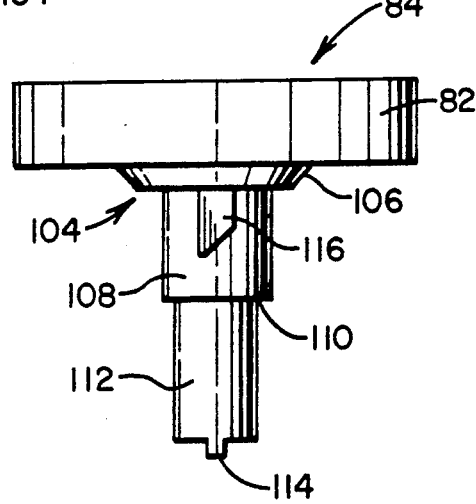
FIG. 5 is a side view of a rotatable valve employed with the apparatus of FIG. 1.
Figure 7:
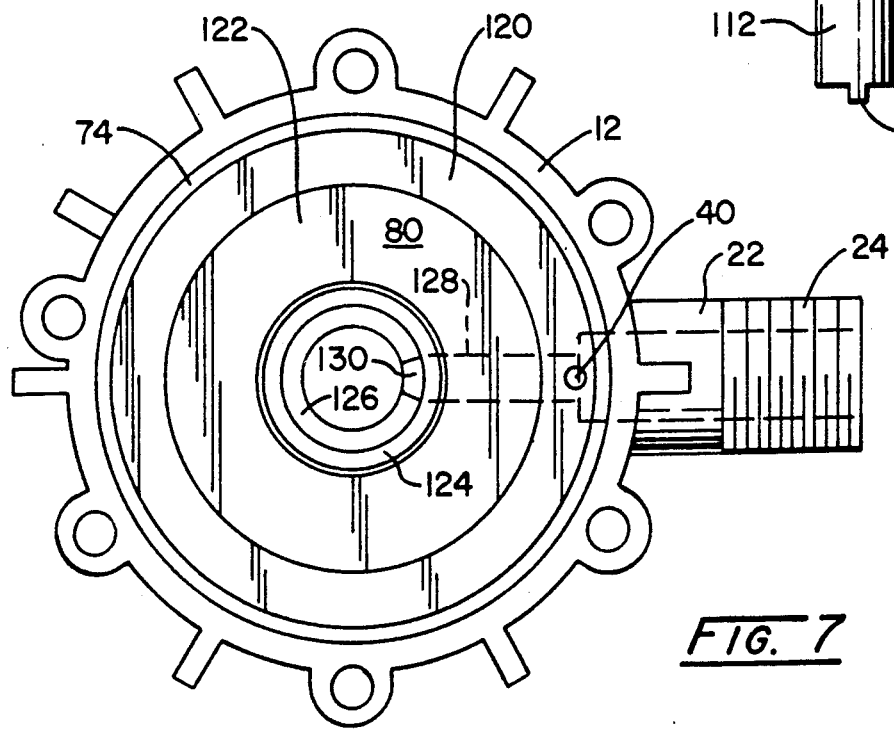
FIG. 7 is a partial top view of the apparatus of FIG. 1 with portions removed to reveal internal structure.

FIG. 5 reveals that the rotatable valve 84 includes a valve closure portion shown generally at 104 having a beveled component 106 extending from the rotational drive component 82, as well as a cylindrical valve shaft 108 extending to a valve shoulder 110 and from which there extends a valve support stem 112. Stem 112 also includes a detent component 114 which is utilized as a coupling structure for the manual rotation thereof. Of particular note, however, is a camming stem 116 formed integrally with the valve shaft 108. This camming stem 116 functions to retain the rotatable valve in an open orientation during its slow, incremental rotation carried out by the action of pawl 90 performing in response to the eccentric output of the reduction gear train. Referring additionally to FIG. 7, a view looking into housing 12 without the presence of gear housing 38 or rotatable valve 84 is presented. In the figure, the shoulder 120 upon which the gear housing 38 rests is revealed and, adjacent to that shoulder, is the valve chamber 80. The lower surface of valve chamber 80 is represented at 122, which leads to a beveled valve seat represented at 124. Below the beveled valve seat 124 there is formed a circular valve cam surface 126. It is upon this surface 126 that the camming stem 116 of rotatable valve 84 slides during that period of performance of the monitoring device 10 when the valve components of it are open. This open valve relationship is revealed in the orientation of components shown in FIG. 3. In this regard, during open orientation, the rotatable valve 84 is elevated by virtue of the camming action of camming stem 116 against the valve cam surface 126 and the output port 128 seen leading to conduit 22 is open to permit fluid passage.

Returning to FIG. 7, when the camming stem 116 as seen in FIG. 5 has rotated with the rotatable valve 84 to the position of a detent or closing slot 130 extending downwardly from the valve cam surface 126, the rotatable valve 84 will drop under spring bias as the camming stem 116 inserts within slot 130.

Figure 8:
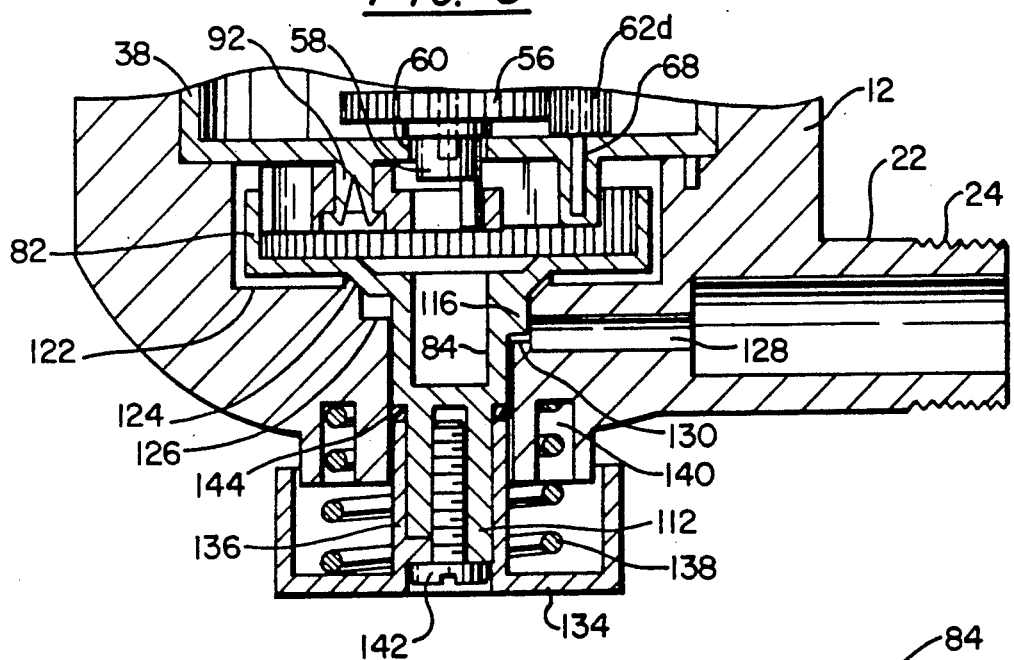
FIG. 8 is a partial sectional view similar to that shown in FIG. 3 but representing the valve components thereof in a closed orientation.

Referring to FIG. 8, the orientation of the components thus far described for a condition wherein the camming stem 116 has dropped into slot 130 and the valve is closed is represented. Note that the output port 128 now is substantially closed by the rotatable valve 84. In this orientation, the valve 84 cannot rotate and a cuing feature ensures requiring householder intervention to reset the monitoring device 10. This reminds the householder to replace an associated filtering medium.

The resetting components of the monitoring device 10 are located at the bottom of housing 12 and include a hand manipulable cylindrically shaped knob 134 having a hollow central stem 136 which extends over the stem portion 112 of rotatable valve 84. The internal head portion of the stem 136 is configured to abuttably interact with the detent component 114 (FIG. 5) of the rotatable valve 82. Thus, rotation of the knob 134 will, in turn, cause rotation of the rotatable valve 84. A helical spring 138 is shown interposed between the knob 134 and a cylindrically shaped slot 140 formed within the bottom of housing 12. Knob 134 is retained against the stem 112 by a screw 142 and the arrangement additionally functions to position a flexible O-ring 144 to provide a fluid tight seal for the assembly. Spring 138 functions to bias the rotatable valve 84 downwardly both in the closed position shown in FIG. 5 and to provide a bias of the camming stem 116 against the corresponding valve cam surface 126 of housing 12 when the open orientation represented in FIG. 3 is at hand. This bias also facilitates the valve closing action as camming stem 116 into slot 130.

To reset the device 10, the user depresses the dial 134 to compress spring 138. As a consequence, the camming stem 116 is elevated. The user then rotates knob 134 and the camming stem 116 then is elevated over camming surface 126. Release of the knob 134 permits the open orientation of the valve 84 and rotation thereof by the induction gears and pawl and ratchet assembly is permitted. As is apparent, the extent of rotation of knob 134, in turn, adjusts the quantity of fluid monitored. Appropriate indicia (not shown) may be provided for this use. The extent of movement of valve 84 in the course of either closing or during the resetting and opening thereof is quite small being, for example, about 0.070 inch.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. Apparatus for monitoring a flow of fluid through a conduit comprising:

a housing having an input port and an output port connectable with said conduit;

a turbine chamber within said housing in fluid communication with said input port for receiving fluid under pressure;

a turbine mounted within said turbine chamber and rotatable by fluid incident thereon from said input port;

a gear chamber within said housing in fluid communication with said turbine chamber;

a reduction gear train within said gear chamber rotatably drivably coupled with said turbine, having a predetermined reduction ratio and a rotational eccentric output component;

a valve seat within said housing adjacent said output port and including an open valve cam surface, and a valve closing detent portion, a rotatable valve member mounted within said housing having a rotational drive component positioned adjacent and movable in select correspondence with said eccentric output component and a valve closure portion extending therefrom including a camming stem slideably movable upon said valve cam surface to retain said valve closure position in an open valve orientation and movable within said valve seat detent portion to effect blockage of fluid flow through said output port; and reset means for repositioning said rotatable valve camming stem upon said valve cam surface to effect opening said valve for permitting the flow therethrough of a predetermined quantity of fluid.

2. The apparatus of claim 1 in which said reduction gear train and said rotatable valve member are configured for rotation of said rotatable valve with respect to rotation of said turbine at a ratio greater than 1:1,000,000.

3. The apparatus of claim 1 in which said rotational drive component of said rotatable valve includes a periphery having a ratchet configuration and a drive pawl mounted for driven movement by said rotational eccentric output for effecting rotation of said rotatable valve.

4. The apparatus of claim 3 in which said rotational eccentric output is a lever actuator extending from said reduction gear train into slideable drive engagement with said drive pawl.

5. The apparatus of claim 3 in which:
said pawl is pivotally mounted at said gear chamber; and
said rotational drive component includes a stop pawl for restricting rotation of said rotatable valve to a single direction.

6. The apparatus of claim 1 including a valve chamber intermediate said gear chamber and said output port and in fluid communication therebetween for rotatably retaining said rotatable valve rotational drive component.

7. The apparatus of claim 1 in which:

said camming stem is formed integrally with said valve closure portion of said rotatable valve; and said valve closing detent portion is a slot formed within said valve seat and dimensioned to receive said camming stem.

8. The apparatus of claim 1 in which said reset means comprises:

a rotatable dial coupled with said rotatable valve and located outwardly of said housing; and spring means for biasing said dial away from said housing and for biasing said camming stem against said valve cam surface, said dial being manually depressable to remove said camming stem from said detent portion and rotatable to set said predetermined quantity of fluid.

9. The apparatus of claim 1 in which:

said rotational drive component of said rotatable valve includes a periphery having a ratchet configuration and a drive pawl mounted for driven movement by said rotational eccentric output for effecting rotation of said rotatable valve; and said rotational eccentric output is a lever actuator extending from said reduction gear train into slideable drive engagement with said drive pawl.

10. The apparatus of claim 9 in which:
said pawl is pivotally mounted at said gear chamber; and
said rotational drive component includes a step pawl for restricting rotation of said rotatable valve to a single direction.

11. The apparatus of claim 10 including a valve chamber intermediate said gear chamber and said output port and in fluid communication therebetween for rotatably retaining said rotatable valve rotational drive component.

12. The apparatus of claim 1 including:

a valve chamber intermediate said gear chamber and said output port and in fluid communication therebetween for rotatably retaining said rotatable valve rotational drive component;

said camming stem is formed integrally with said valve closure portion of said rotatable valve;

said valve closing detent portion is a slot formed within said valve seat and dimensioned to receive said camming stem;

said reset means includes a rotatable dial coupled with said rotatable valve and located outwardly of said housing, and spring means for biasing said dial away from said housing and for biasing said camming stem against said valve cam surface, said dial being manually depressable to remove said camming stem from said detent portion and rotatable to set said predetermined quantity of fluid.

13. Apparatus for monitoring the flow of fluid under pressure through a filter medium of given capacity, comprising:

a housing having a body member and a cap coupled thereto;

a turbine chamber formed within said housing cap;

a gear chamber within said housing body extending from said turbine chamber when said cap is coupled with said body and in fluid flow communication therewith;

a valve chamber within said housing body adjacent to and in fluid flow communication with said gear chamber and having a valve seat, a valve cam surface, and a valve closing slot;

a turbine rotatably mounted within said turbine chamber and having a cylindrical stem portion extending into said gear chamber;

an input port in fluid flow communication with said turbine chamber for directing said flow of fluid under pressure thereinto to effect rotation of said turbine;

a reduction gear train within said gear chamber, having an input stage in rotationally driven contact with said turbine stem portion and having a predetermined reduction ratio providing a rotational output along a given axis extending within said valve chamber;

a rotatable valve mounted for rotation about a valve axis parallel with said given axis, having a rotational drive component connected in driven relationship with said reduction gear train output, a valve closure portion extending therefrom and movable along said valve axis into closing contact with said valve seat, and a camming stem slideably movable upon said valve cam surface during rotation to retain said valve closure portion at a location remote from said valve seat effecting an open valve orientation, and movable along said valve axis into said closing slot to effect positioning of said valve closure portion into valve closing contact with said valve seat;

an output port in fluid flow communication with said valve chamber for receiving said flow of fluid under pressure when said rotatable valve is in said open valve orientation; and reset means for repositioning said rotatable valve camming stem for movement upon said valve cam surface to provide for said rotation of said rotatable valve about said valve axis an amount predetermined with respect to said filter medium capacity.

14. The apparatus of claim 13 in which:

said reduction gear train rotational output includes a rotational component from which extends an actuator eccentrically disposed with respect to said given axis; and said rotational drive component of said rotatable valve includes a cylindrical perphery having a ratchet configuration and a drive pawl having a slot for slideably receiving said actuator in driven relationship for effecting rotation of said rotatable valve.

15. The apparatus of claim 14 in which said rotational drive component includes a stop pawl for restricting rotation thereof to a single direction.

16. The apparatus of claim 14 including a reduction gear housing insertably positioned within said reduction gear chamber for retaining said reduction gear train and a gear housing top component connected thereto and located adjacent said turbine chamber, said top component having an aperture for supportively receiving said turbine cylindrical stem portion.

17. The apparatus of claim 16 in which said reduction gear housing includes a bottom side having an aperture formed therein for receiving said reduction gear train rotational component.

18. The apparatus of claim 17 in which said gear housing bottom side includes an integrally formed bifurcate shaft for pivotally receiving and retaining said drive pawl.

19. The apparatus of claim 18 in which said rotational drive component includes a stop pawl formed integrally with and extending from said reduction gear housing bottom side and slideably engageable with said ratchet configuration of said cylindrical periphery.

20. The apparatus of claim 18 in which said reset means comprises:

a hand rotatable dial coupled with said rotatable valve and located outwardly of said housing body member;

spring means for biasing said dial away from said body housing and for biasing said camming stem against said valve cam surface, said dial being manually depressable to move said rotatable valve along said valve axis to remove said camming stem from said closing slot and rotatable said amount predetermined with respect to said filter medium capacity.

* * * * *